United States Patent

Godai et al.

[11] 4,068,113
[45] Jan. 10, 1978

[54] BARE ELECTRODE FOR WELDING OF LOW TEMPERATURE STEEL

[75] Inventors: Tomokazu Godai, Kamakura; Isao Aida, Fujisawa; Masatoshi Nakagaki, Yokohama, all of Japan

[73] Assignee: Kobe Steel, Ltd., Kobe, Japan

[21] Appl. No.: 635,321

[22] Filed: Nov. 26, 1975

[30] Foreign Application Priority Data

Nov. 27, 1974 Japan .................... 49-135522

[51] Int. Cl.$^2$ ............................................ B23K 35/30
[52] U.S. Cl. ..................... 219/146.23; 219/137 WM
[58] Field of Search ................ 219/137 WM, 145, 146

[56] References Cited

U.S. PATENT DOCUMENTS

| | | | |
|---|---|---|---|
| 2,963,570 | 12/1960 | Rieppel | 219/145 X |
| 3,476,909 | 11/1969 | Kameda et al. | 219/145 X |
| 3,527,920 | 9/1970 | Dorschu | 219/145 X |
| 3,590,211 | 6/1971 | Ballass et al. | 219/145 X |
| 3,745,294 | 7/1973 | Arikawa et al. | 219/137 WM X |

Primary Examiner—J. V. Truhe
Assistant Examiner—N. D. Herkamp
Attorney, Agent, or Firm—Oblon, Fisher, Spivak, McClelland & Maier

[57] ABSTRACT

A bare welding electrode of a diameter of at least 3.0 mm for use in a large current gas shielded arc welding process in which steel for low temperature use is welded by a welding current of at least 500 A in a shielding gas composed mainly of an inert gas such as Ar, He or the like. In one aspect the electrode comprises up to 0.12% C, up to 0.8% Si, up to 3.0% Mn up to 0.25% Ti, at least one member selected from the group consisting of up to 4.0% Ni, up to 0.8% Cr and up to 1.0% Mo and the carbon equivalent (Ceq), of said electrode being up to 0.60% which is represented by the formula $$Ceq = C + 1/6Mn + 1/24Si + 1/40Ni + 1/5Cr + \tfrac{1}{4} Mo$$

wherein each element denotes the content, % by weight of the element. In the second aspect the bare welding electrode comprises up to 0.12% C, up to 0.8% Si, up to 3.0% Mn, up to 0.19% Ti, 0.0005 to 0.015% B, at least one member selected from the group consisting of up to 4.0% Ni, up to 0.8% Cr and up to 1.0% Mo and which a carbon equivalent of up to 0.60%, calculated according to the above formula.

8 Claims, 3 Drawing Figures

BARE ELECTRODE FOR WELDING OF LOW TEMPERATURE STEEL

BACKGROUND OF THE INVENTION

1. Field of the Invention

This invention relates to a bare electrode for welding of low temperature steel. More particularly, this invention relates to a bare welding electrode for use in a large current, gas shielded arc welding process in which steel for low temperature use, is welded with high efficiency. The electrode provides a joint having good properties, especially high notch toughness, and which can fully meet demands to improve the properties of welded joints. The need for improved welded joints is increasing with propagation of automation and high efficiency operation in welding processes.

2. Description of the Prior Art

In gas shielded arc welding, shielding gases are generally divided into three types, namely an inert shielding gas composed solely of an inert gas such as Ar, He or the like; an inert gas, in a broad sense, formed by adding an active gas such as $O_2$, $CO_2$ or the like to an inert gas, and a carbon dioxide shielding gas represented by $CO_2$ or $CO_2$-$O_2$. In gas shielded arc welding using a shielding gas, such as those mentioned above, when the inert gas-active gas ratio is changed in the shielding gas, as, the content of $CO_2$ or $O_2$ is increased, the oxygen content in the weld metal increases. The notch toughness of the weld metal is reduced as its oxygen content increases. More specifically, as is shown in FIG. 1, as the content of the active gas, such as $CO_2$, $O_2$ or the like increases in the inert shielding gas the oxygen content in the weld metal gradually increases. Further, as is shown in FIG. 2, the notch toughness of the weld metal is reduced as the content of the active gas such as $CO_2$, $O_2$ or the like in the shielding gas increases.

In the conventional gas shielded arc welding of steel, fine wires having a diameter of about 0.8 mm to 1.6 mm are generally used as the electrode and the maximum welding current applied is about 400 Amps. According to such conventional processes the notch toughness of the weld metal can be improved by reducing the amount of $CO_2$, $O_2$ or the like in the shielding gas. However, the conventional processes cannot meet the increasing demands to improve and enhance the operating efficiency and welding capacity. This is especially true in the case of steels for low temperature use, relatively thick plates are often used for satisfying low temperature demands which require products having excellent toughness at low temperatures.

As a means for meeting the foregoing demands, there can be mentioned the so called large current shielded arc welding process in which a large diameter wire (having a diameter of at least 3.0 mm) is used. The welding is performed by applying a large welding current so as to improve the efficiency in the gas shielded arc welding. In this welding process, however, the cooling rate of the weld metal is lower than in the gas shielded arc welding process using a small diameter wire, as a result the grain size of the weld metal is coarse. Also because of the difference of the arc phenomenon the quality of the weld metal cannot be improved merely by reducing the active gas content in the shielding gas, and the notch toughness of the weld cannot be improved at all.

One means for preventing the formation of coarse grain size in the weld metal, is by the known technique of adding Ti or Ti plus B to make the grain size finer and thereby improve the notch toughness (see, for example, Japanese Patent Publication No. 12258/68). However, in the large current inert gas shielded arc welding processes, the low temperature notch toughness is only slightly improved by the mere addition of such elements. Further, satisfactory results are not obtained when the above technique is applied to the large current inert gas shielded arc welding of steel for low temperature use. Accordingly, there exists the need for a wire suitable for use in large current gas shielded arc welding of low temperature steels.

The present inventors have conducted extensive research on the arc phenomenon and its metallurgical aspects in an attempt to overcome the defects of conventional large current inert gas welding processes for low temperature steels. As a result of this research it was found that in the large current, inert gas shielded arc welding processes using a large diameter wire, that the wire should contain Ti or Ti and B in suitable amounts together with suitable amounts of a deoxidizing element and at least one alloying element selected from Ni, Cr and Mo. Further, that when the strength of the weld metal is maintained at a level as low as possible in order to impart a sufficient plastic deformability under an impact load or tensile load to the weld metal, the welding can be performed at a high efficiency using a large current and the low temperature toughness is remarkably improved.

SUMMARY OF THE INVENTION

It is a primary object of the present invention to provide a bare electrode capable of providing a weld metal having a very excellent low temperature toughness using the large current high efficiency welding process.

In accordance with this aspect of the present invention there is provided a bare welding electrode of a diameter of at least 3.0 mm for use in a large current gas shielded arc welding process. In this process steel for low temperature use is welded by a welding current of at least 500 A in a shielding gas composed mainly of an inert gas such as Ar, He or the like. The electrode of the present invention comprises up to 0.12% C, up to 0.8% Si, up to 3.0% Mn, up to 0.25% Ti and at least one member selected from the group consisting of up to 4.0% Ni, up to 0.8% Cr and up to 1.0% Mo and the carbon equivalent (Ceq), of said electrode being up to 0.60% which is represented by the formula $$Ceq = C + 1/6Mn + 1/24Si + 1/40Ni + 1/5Cr + 1/4Mo$$

wherein each element symbol denotes the content, % by weight, of the element.

In accordance with a second aspect of the present invention, there is provided a welding bare electrode of a diameter of at least 3.0 mm for use in the above described large current gas shielded arc welding process. This electrode comprises up to 0.12% C, up to 0.8% Si, up to 3.0% Mn, up to 0.019% Ti, 0.0005 to 0.015% B and at least one member selected from the group consisting of up to 4.0% Ni, up to 0.8% Cr and up to 1.0% Mo and the carbon equivalent (Ceq) of said electrode being up to 0.60% and which is represented by the following formula:

$$Ceq = C + 1/6Mn + 1/24Si + 1/40Ni + 1/5Cr + 1/4Mo$$

wherein each element symbol denotes the content, % by weight, of the element.

DETAILED DESCRIPTION OF THE PREFERRED EMBODIMENTS

Figure 1:
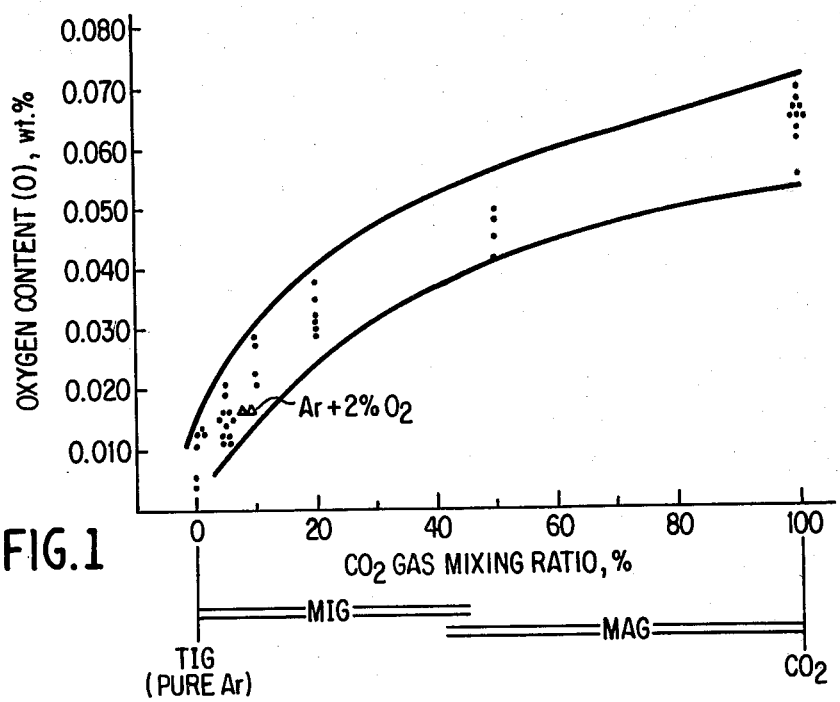
FIG. 1 is a graph illustrating the relation between the carbon dioxide gas mixing ratio and the oxygen content in the weld metal in the gas shielded arc welding.
Figure 2:
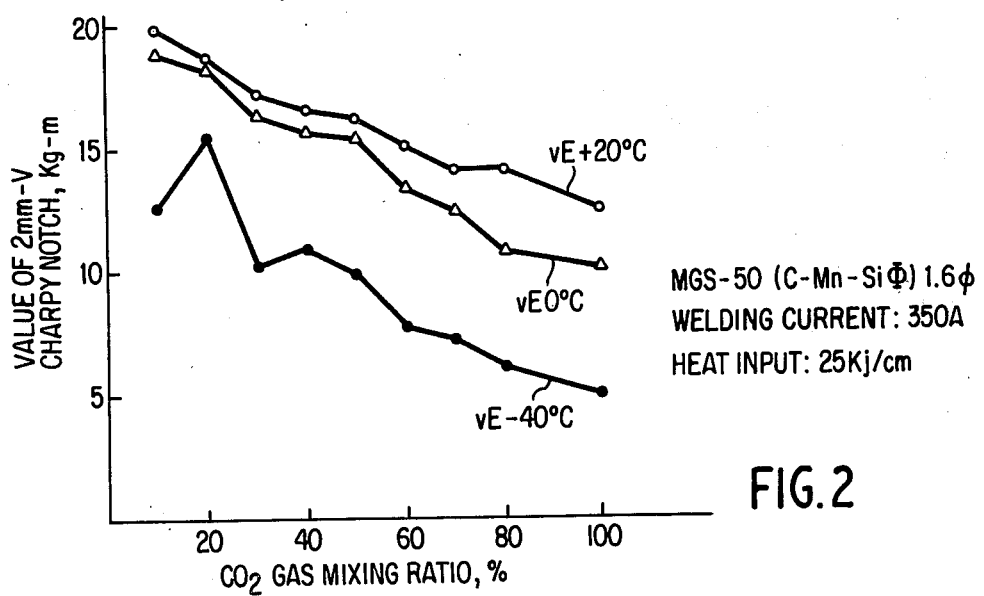
FIG. 2 is a graph showing the relation between the carbon dioxide gas mixing ratio and the notch toughness of the weld metal observed when the same wire was used for the gas shielded arc welding.

Since a large current is used for welding in the present invention a shielding gas composed mainly of an inert gas such as Ar, He or the like is used. If an inert gas is not used, the weld metal is excessively oxidized and its low temperature toughness cannot be improved effectively. It is preferred that the content of the inert gas, such as Ar, He or the like, in the shielding gas atmosphere be at least 60% and the content of the active gas, such as $CO_2$, $O_2$ or the like, be less than 40%.

In the present invention the diameter of the wire is at least 3.0 mm and the welding current is at least 500 amps. In the gas shielded arc welding, it is considered that the welding operation efficiency will be increased by use of large welding current. However, when this technique is applied to the conventional process using a small diameter wire, no expansion of the arc can be obtained even when using a large welding current, because the wire diameter is small. Abnormal melting occurs in areas just below the arc and the deposition of the welding wire by the Joule heat becomes excessive. Accordingly, normal penetration cannot be obtained. Further, the deposited weld metal forms convex beads and there is a lack of fusion between the base metal and the weld metal. In order to avoid occurrence of these undesired phenomena, a wire of a large diameter is used to broaden the expansion of the arc. When a welding current of at least 500 amps is applied, to increase the welding operation efficiency, it is preferred that a wire having a diameter of at least 3.0 mm be used. When a wire of a diameter of at least 3.0 mm is used, it is possible to perform welding using a welding current lower than 500 amps, but the welding operation efficiency is drastically reduced. Good low temperature toughness may be obtained by employing a large diameter wire having the same composition as that of a commercially available small diameter wire.

The chemical composition of the wire to be used in the present invention will now be described.

In the present invention, it is indispensable that the carbon content should not exceed 0.12%. If the carbon content exceeds 0.12%, high temperature cracks are readily formed by the large welding current applied to the large diameter wire. Further, the strength of the weld metal is increased and the low temperature toughness is decreased. Since a large welding current is applied to the large diameter wire, Si exhibits a high deoxidizing effect, but if the content of Si exceeds 0.8 %, the low temperature toughness of the weld metal is decreased and high temperature cracks are readily formed when large currents are applied. Mn is a strong deoxidizing agent and it has an effect of improving the toughness, but if the content of Mn exceeds 3.0%, the strength of the weld metal is increased which decreases the low temperature toughness and the crack resistance of the weld method. A small amount of Ti is used for making the grain size finer when welding is carried out using large currents such as 500 amps or higher. The amount added of Ti is up to 0.25% in an inert gas atmosphere or Ar, He or the like (for example, a shielding gas atmosphere containing at least 60% of an inert gas such as Ar, He or the like) if B is not added. If the Ti content exceeds 0.25% the weld metal is drastically hardened and becomes brittle. B is added in an amount within a range of 0.0005 to 0.015% selected appropriately depending on the composition of the shielding gas, the welding current, the welding heat input and other conditions, in the co-presence of up to 0.19% Ti. The addition of B is effective for improving the low temperature toughness, but if the B content exceeds 0.015%, the low temperature toughness is drastically decreased. In the present invention, it is preferred that at least one element selected from the group of Ni, Cr and Mo be added in an amount appropriately determined depending on contents of C, Mn, Si and Ti. However, if the Ni content exceeds 4.0%, the Cr content exceeds 0.8% or the Mo content exceeds 1.0%, the weld metal is hardened or the crack resistance is lowered and satisfactory results are not obtained. In this invention, good results are obtained when the carbon equivalent Ceq is adjusted to 0.60% or lower, it is especially preferred that the carbon equivalent be less than 0.55%.

The balance of the bare welding electrode is iron and the inevitable impurities.

In the present invention, excellent effects can be attained by the specific mutual relation among the above-mentioned conditions of the shield gas, the welding current, the wire diameter and the wire composition.

The electrode of the present invention can also be effectively applied to multiple electrode welding.

Having generally described the invention, a more complete understanding can be obtained by reference to certain specific examples, which are provided herein for purposes of illustration only and are not intended to be limiting unless otherwise specified.

EXAMPLE 1

Welding was conducted under the conditions given below using a wire having a composition indicated in Table 1. The results obtained are shown in Table 2.

Table 1

| Chemical Composition (%) of Wire | | | | | |
|---|---|---|---|---|---|
| Wire | C | Si | Mn | Ni | Cr |
| A | 0.06 | 0.30 | 1.90 | 1.40 | — |
| B | 0.07 | 0.31 | 1.74 | 1.34 | — |
| *Wire | Mo | Ti | B | Ceq | Remarks |
| A | 0.29 | 0.30 | — | 0.50 | comparison |
| B | 0.30 | 0.08 | — | 0.48 | present invention |

Steel plate used: 3.5 Ni steel having a thickness of 32 mm
Shielding gas: Ar + 10 % $CO_2$, 50 l/min
Wire diameter: 4.0 mm
Welding Conditions:
  Welding current: 700 A
  voltage: 25 V
  Welding rate: 35 cpm Table 1-continued

| Chemical Composition (%) of Wire |
|---|

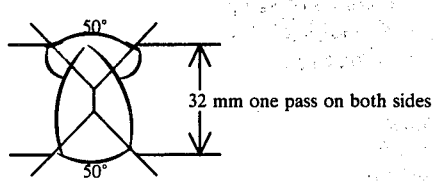

32 mm one pass on both sides

Table 2

| Charpy Impact Value (Kg-m) of Weld Metal | | |
|---|---|---|
| Wire | vE-60° C | vE-80° C |
| A | 1.2 | 0.7 |
| B | 14.4 | 7.9 |

The wires used in this Example are Ti-type wires satisfying the requirement of Ceq ≦ 0.60. Wire A has a Ti content of 0.30% and the wire B has a Ti content of 0.08%. Wire B satisfies the Ti content requirement of the present invention, namely that the Ti content of up to 0.25%. From the foregoing experimental results, it is readily apparent that the weld metal formed by using the wire B according to the present invention has a very good toughness.

EXAMPLE 2

Welding was conducted under the conditions given below using a wire having the composition indicated in Table 3. The results obtained are shown in Table 4.

Table 3

| Chemical Composition (%) of Wire | | | | | |
|---|---|---|---|---|---|
| Wire | C | Si | Mn | Ni | Cr * |
| C | 0.06 | 0.30 | 2.00 | — | — |
| D | 0.04 | 0.30 | 1.87 | — | — |
| *Wire | Mo | Ti | B | Ceq | Remarks |
| C | 0.51 | 0.14 | 0.020 | 0.53 | comparison |
| D | 0.30 | 0.12 | 0.006 | 0.44 | present invention |

Steel plate used: 3.5 Ni steel for low temperature use
    having a thickness of 25 mm
Shielding gas: Ar + 10 % $CO_2$, 50 l/min
Wire diameter: 4.0 mm
Welding conditions:
  welding current: 650 A
  voltage: 25 V
  welding rate: 37 cpm

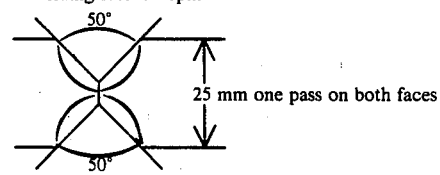

25 mm one pass on both faces

Table 4

| Charpy Impact Value (Kg-m) of Weld Metal | | |
|---|---|---|
| Wire | vE-60° C. | vE-80° C |
| C | 3.0 | 1.2 |
| D | 12.0 | 8.7 |

Wires used in this Example are Ti-B type wires satisfying the requirement of Ceq ≦ 0.60. Wire C has a B content of 0.020% and the wire D has a B content of 0.006%. Wire D satisfies the boron content requirement of the present invention. From the results shown in Table 4, it is readily apparent that the wire D according to the present invention has a very good low temperature toughness.

EXAMPLE 3

Welding was carried out under the conditions given below using a wire having the composition indicated in Table 5. The results obtained are shown in Table 6.

Table 5

| Chemical Composition (%) of Wire | | | | | |
|---|---|---|---|---|---|
| Wire | C | Si | Mn | Ni | Cr * |
| G | 0.07 | 0.31 | 2.15 | 3.8 | — |
| H | 0.07 | 0.28 | 1.86 | 1.04 | — |
| *Wire | Mo | Ti | B | Ceq | Remarks |
| G | 0.28 | 0.13 | 0.008 | 0.64 | comparison |
| H | 0.39 | 0.04 | 0.004 | 0.52 | present invention |

Steel plate used: 2.5 Ni steel for low temperature use
    having a thickness of 25 mm
Shielding gas: Ar + 10 % $CO_2$, 50 l/min
Wire diameter: 4.0 mm
Welding conditions:
  welding current: 700 A
  voltage: 26 V
  welding rate: 30 cpm

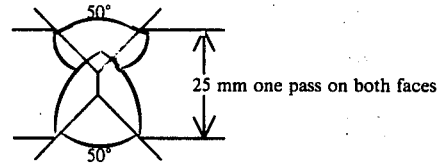

25 mm one pass on both faces

Table 6

| Charpy Impact Value (Kg-cm) of Weld Metal | | |
|---|---|---|
| Wire | vE-60° C. | vE-80° C. |
| G | 2.5 | 1.8 |
| H | 14.3 | 10.5 |

Figure 3:
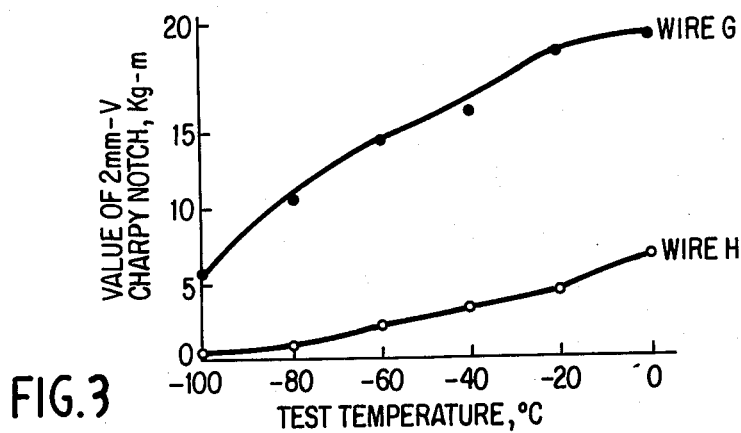
FIG. 3 is a graph illustrating the relation between the absorbed energy and the temperature observed when the wire of the present invention and a comparative wire were tested.

From the comparison of wire G having a Ceq value higher than 0.60 with wire H which is according to the present invention, it is readily apparent that good toughness may be obtained if the Ceq value is adjusted to be 0.60% or lower in the appropriate chemical composition. This is also seen in the results shown in FIG. 3. Namely, wire H which is according to the present invention, possesses excellent charpy notch characteristics compared with wire G which fails to meet the requirement of Ceq ≦ 0.60.

EXAMPLE 4

Welding was carried out under the conditions given below using a wire having the composition shown in Table 7. The results obtained are shown in Table 8.

Table 7

| Chemical Composition (%) of Wire | | | | | |
|---|---|---|---|---|---|
| Wire | C | Si | Mn | Ni | Cr * |
| I(1.6 mm in diameter) | 0.07 | 0.28 | 1.90 | 1.02 | — |
| J(4.0 mm in diameter) | 0.07 | 0.28 | 1.90 | 1.02 | — |
| *Wire | Mo | Ti | B | Ceq | Remarks |
| I(1.6 mm in diameter) | 0.40 | 0.12 | 0.008 | 0.52 | comparison |
| J(4.0 mm in diameter) | 0.40 | 0.12 | 0.008 | 0.52 | present invention |

Steel plate used: 2.5 Ni steel for low temperature use,
    25 mm in thickness
Shielding gas: Ar + 10 % $CO_2$
Wire diameter: 1.6 mm (wire I), 4.0 mm (wire J)
Welding conditions:
  welding current: 330 A (wire I); 700 A (wire J)
  voltage: 27 V (wire I); 26 V (wire J)
  welding rate: 40 cpm (wire I); 20 cpm (wire J)

Table 7-continued

Chemical Composition (%) of Wire

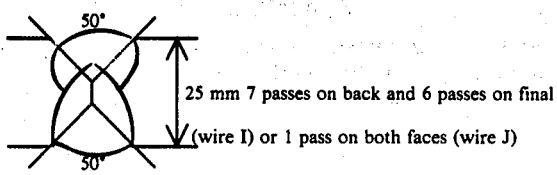

25 mm 7 passes on back and 6 passes on final
(wire I) or 1 pass on both faces (wire J)

Table 8

| Charpy Impact Value (Kg-m) of Weld Metal | | |
| --- | --- | --- |
| Wire | vE-60° C. | vE-80° C. |
| I | 1.2 | 0.9 |
| J | 15.8 | 8.8 |

From the results obtained in this Example, it will readily be understood that wire J having a diameter of 4.0 mm according to the present invention provides an excellent low temperature toughness over comparative wire I having a diameter of 1.6 mm, though both the wires I and J have the same chemical composition.

EXAMPLE 5

Welding was carried out under the conditions given below using a wire having a composition indicated in Table 9. The results obtained are shown in Table 10.

Table 9

| Chemical Composition (%) of Wire | | | | | |
| --- | --- | --- | --- | --- | --- |
| Wire | C | Si | Mn | Ni | Cr * |
| K | 0.13 | 0.29 | 2.07 | — | 0.45 |
| L | 0.06 | 0.31 | 2.00 | — | 0.35 |
| *Wire | Mo | Ti | B | Ceq | Remarks |
| K | 0.32 | 0.13 | — | 0.66 | comparison |
| L | 0.30 | 0.09 | — | 0.55 | present invention |

Steel plate used: 3.5 Ni steel, 32 mm in thickness
Shielding gas: Ar + 10 % $CO_2$, 50 l/min
Wire diameter: 4.0 mm
Welding conditions:
 welding current: 700 A
 voltage: 26 V
 welding rate: 35 cpm

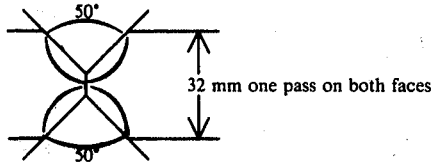

32 mm one pass on both faces

Table 10

| Charpy Impact Value (Kg-cm) of Weld Metal | | |
| --- | --- | --- |
| Wire | vE-60° C. | vE-80° C. |
| K | 5.5 | 1.7 |
| L | 15.2 | 13.2 |

In this example, the wire L of the present invention was compared with wire K which has a Ceq value higher than 0.60. Both the wires are of the C-Si-Mn-Cr-Mo-Ti system. From the above results, it is readily apparent that good toughness can be obtained when the Ceq value is adjusted to 0.60 or lower in the appropriate chemical composition.

From the foregoing illustrations, it will readily be understood that a weld metal having excellent low temperature toughness may be obtained by using as the bare electrode for welding of steel for low temperature use according to the electrode of the present invention.

Having now fully described the invention, it will be apparent to one of ordinary skill in the art that many changes and modifications can be made thereto without departing from the spirit or scope of the invention as set forth herein.

What is claimed as new and intended to be covered by letters patent is:

1. A bare welding electrode of a diameter of at least 3.0 mm for use in a large current gas shielded arc welding process in which steel for low temperature use is welded by a welding current of at least 500 amps in shielding gas composed mainly of an inert gas, said electrode consisting essentially of 0.04 to 0.07 wt. % C, up to 0.8 wt. % Si, up to 3.0 wt. % Mn, up to 0.19 wt. % Ti, 0.04 - 1.34 wt. % of at least one member selected from the group consisting of Ni, Cr, and Mo, and the balance iron and impurities, and wherein the carbon equivalent (Ceq) of said electrode ranges from 0.44 to 0.55 wt. % and is represented by the formula:

$$Ceq = C + 1/6 \, Mn + 1/24 \, Si + 1/40 \, Ni + 1/5 \, Cr + 1/4 \, Mo.$$

2. The bare electrode of claim 1 wherein the electrode has a diameter of at least 4 mm.

3. A bare welding electrode of a diameter of at least 3.0 mm for use in a large current gas shielded arc welding process in which steel for low temperature use is welded by a welding current of at least 500 amps in a shielding gas composed mainly of an inert gas, said electrode consisting essentially of 0.04 to 0.07 wt. % C, up to 0.8 wt. % Si, up to 3.0 wt. % Mn, up to 0.19 wt. % Ti, 0.004 to 0.15 wt. % B, 0.04 - 1.34 wt. % of at least one member selected from the group consisting of Ni, Cr and Mo, and the balance iron and impurities, and wherein the carbon equivalent (Ceq) of said electrode ranges from 0.44 to 0.55 wt. % and is represented by the formula:

$$Ceq = C + 1/6Mn + 1/24Si + 1/40Ni + 1/5Cr + 1/4Mo.$$

4. The bare electrode of 3 wherein the electrode has a diameter of at least 4 mm.

5. A large current process for welding low temperature steels, which comprises:
 welding said steel with a welding current of at least 500 amps in a shielding gas which contains at least 60% by volume of an inert gas using a bare welding electrode having a diameter of at least 3.0 mm, which electrode consists essentially of 0.04 to 0.07 wt. % C, up to 0.8 wt. % Si, up to 3.0 wt. % Mn, up to 0.19 wt. % Ti, 0.04 - 1.34 wt. % of at least one member selected from the group consisting of Ni, Cr and Mo and the balance iron and impurities, wherein said electrode has a carbon equivalent (Ceq) ranging from 0.44 to 0.55 wt. % and is represented by the formula:

$$Ceq = C + 1/6Mn + 1/24Si + 1/40Ni + 1/5Cr + 1/4Mo.$$

6. The process of claim 5 wherein at least one of Si or Mn is present.

7. The process of claim 5, wherein both Si and Mn are present.

8. A large current process for welding low temperature steels, which comprises: welding said steel with a welding current with at least 500 amps in a shielding gas which contains at least 60% by volume of an inert gas using a bare welding electrode having a diameter of at least 3.0 mm, which electrode consists essentially of 0.04 to 0.07 wt.% C, up to 0.8 wt.% Si, up to 3.0 wt.% Mn, up to 0.19 wt.% Ti, from 0.0005 to 0.015 wt.% B, from 0.04 – 1.34 wt. % of at least one member selected from the group consisting of Ni, Cr, Mo and the balance iron and impurities, wherein said electrode has a carbon equivalent (Ceq) ranging from 0.44 to 0.55 wt.% and is represented by the formula: Ceq = C + 1/16 Mn + 1/24 Si + 1/40 Ni + 1/5 Cr + 1/4 Mo.

* * * * *